UNITED STATES PATENT OFFICE.

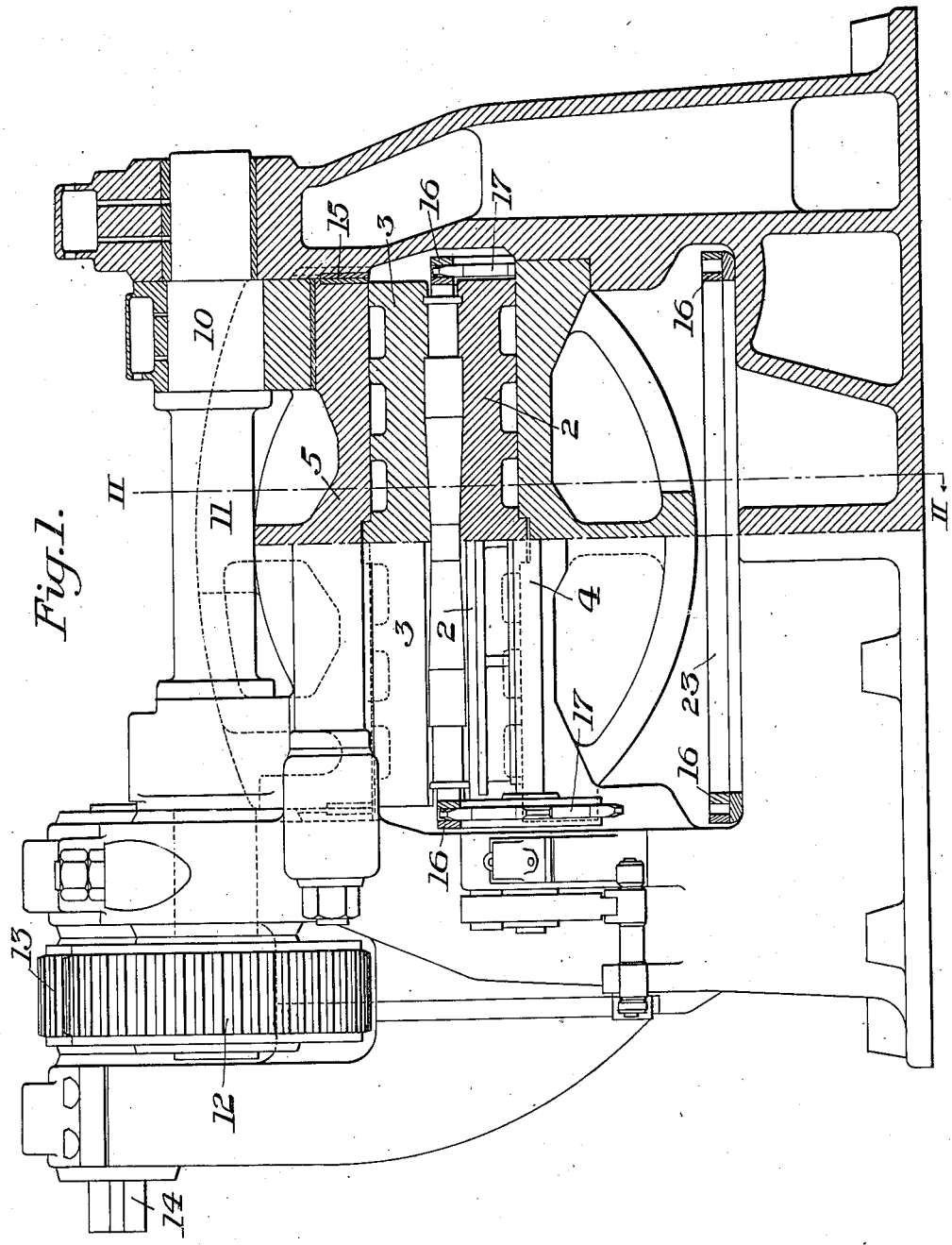

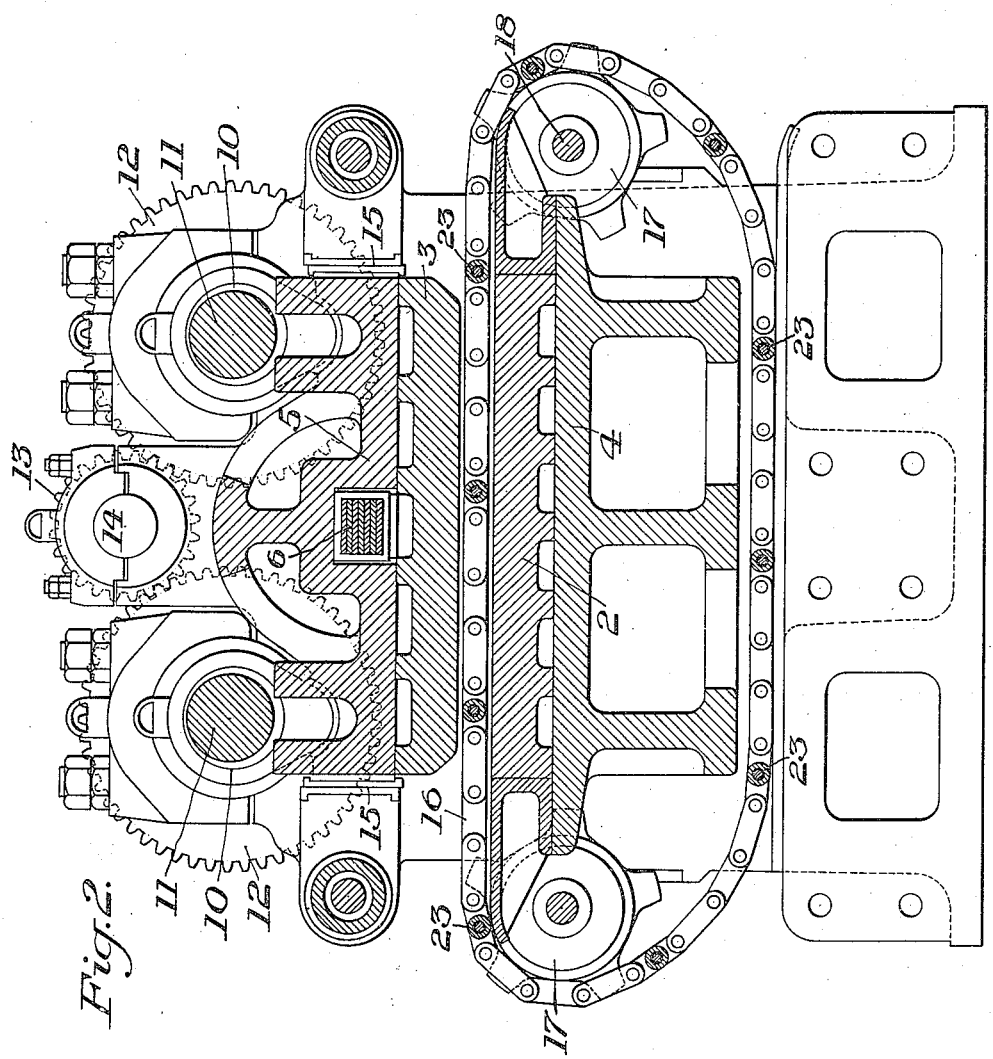

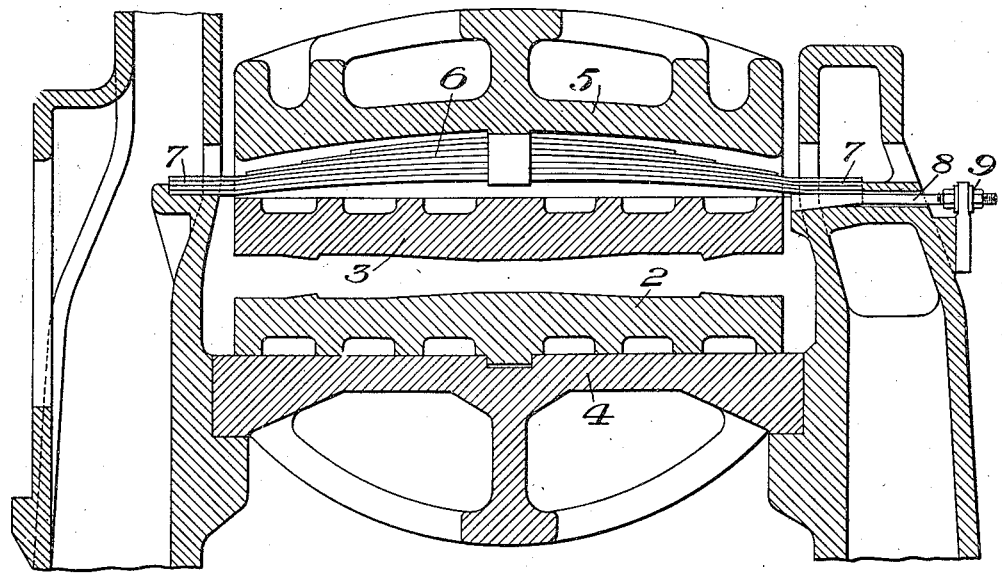
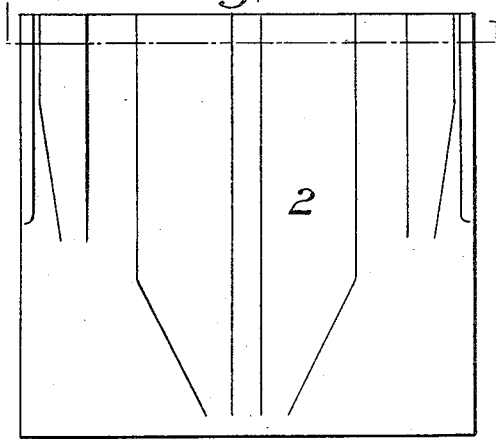
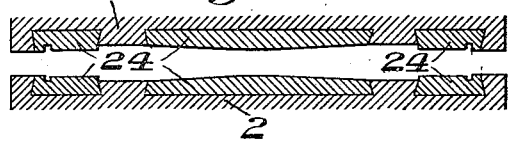

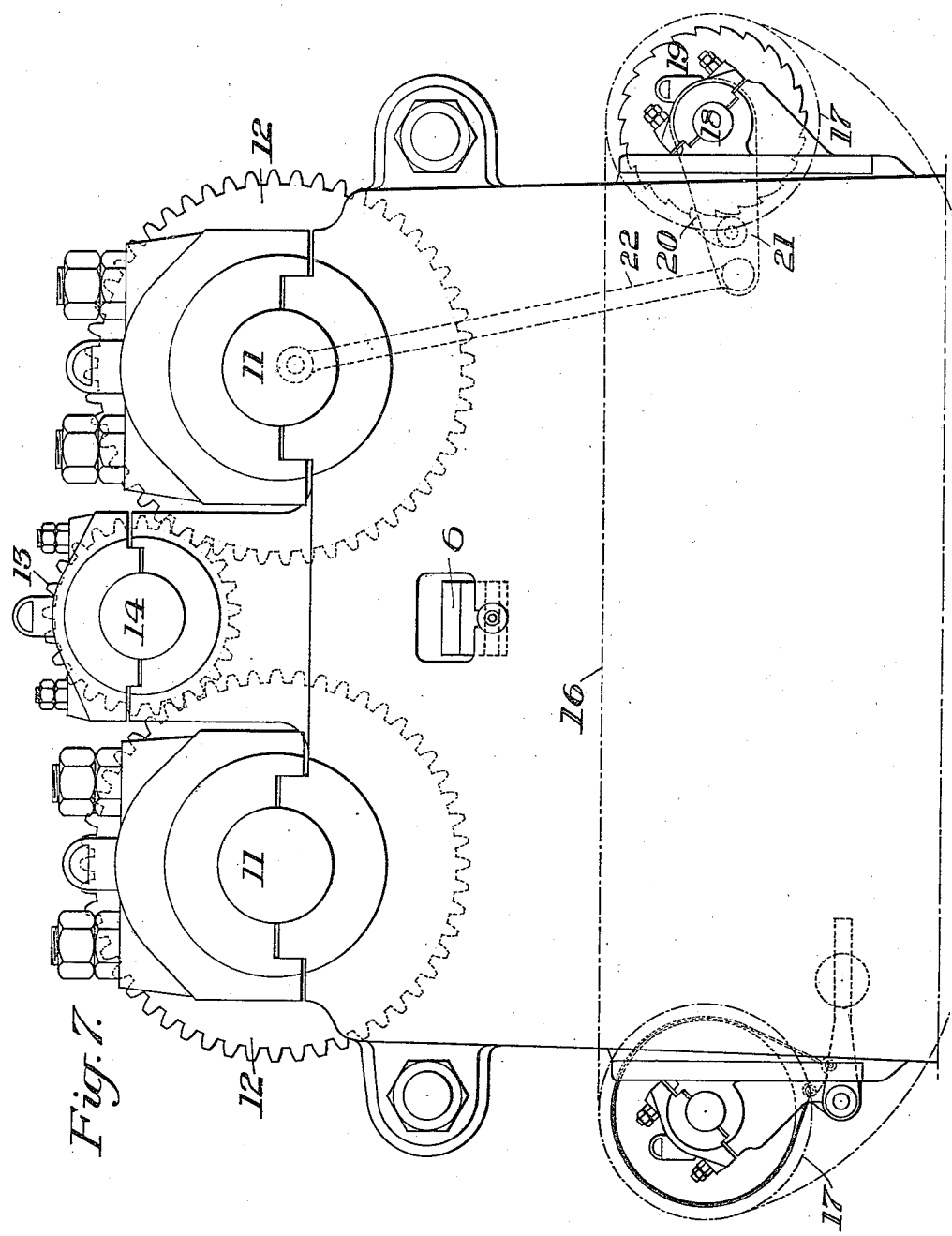

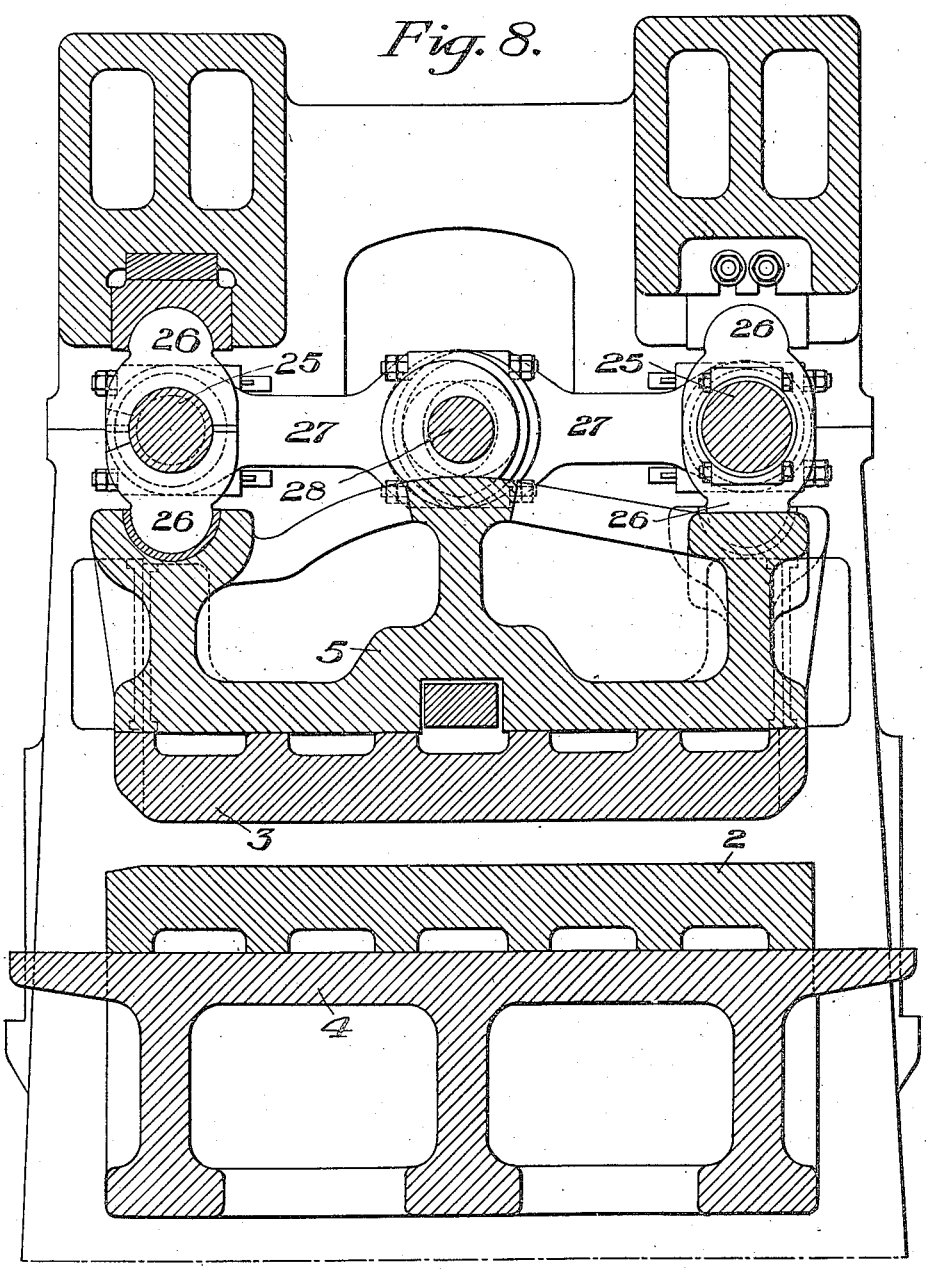

GEORGE G. THORP, OF CHICAGO, ILLINOIS, AND EDWIN E. SLICK, OF PITTSBURG, PENNSYLVANIA.

APPARATUS FOR FORGING AXLES AND SIMILAR ARTICLES.

999,276.  Specification of Letters Patent.  Patented Aug. 1, 1911.

Application filed February 11, 1909. Serial No. 477,378.

*To all whom it may concern:*

Be it known that we, GEORGE G. THORP, of Chicago, Cook county, State of Illinois, and EDWIN E. SLICK, of Pittsburg, Allegheny county, State of Pennsylvania, have invented certain new and useful Improvements in Apparatus for Forging Axles and Similar Articles, of which the following is a full, clear, and exact description, reference being had to the accompanying drawings, forming part of this specification, in which—

Figure 1 is a front elevation, one-half in section, showing apparatus constructed and arranged in accordance with our invention; Fig. 2 is a longitudinal section on the line II—II of Fig. 1; Fig. 3 is a partial cross section; Fig. 4 is a plan view of one of the dies; Fig. 5 is a cross section on the line V—V of Fig. 4; Fig. 6 is a detail longitudinal section showing a modified form of dies; Fig. 7 is a detail view of the chain-driving mechanism; and Fig. 8 is a detail view showing another form of driving mechanism for the upper forging die.

Our invention relates to the manufacture of axles or similar cylindrical articles. Heretofore, it has been proposed to forge these articles between endwise moving dies having elevated or recessed face portions arranged to shape the axle as it is moved between the dies by the reciprocation of one over the other. This method of forging causes piping in the axle and is objectionable.

Our invention is designed to provide apparatus having novel means whereby axles may be rapidly and cheaply forged to shape without causing the piping above referred to.

To that end, the invention consists in rolling the axle blanks on the longitudinal surface of a die and simultaneously forging it by moving an upper die up and down during this travel.

It also consists in shaping these dies so as to gradually give the desired contour to the axle as it is rolled along between them.

In the drawings, referring to Figs. 1 to 7, inclusive, 2 and 3 represent a pair of dies, of which the lower one 2 is fixed and mounted on a suitable bed 4, in the frame-work of the forging press. The upper die 3 is secured to a vertically movable frame 5, to which is imparted an up and down movement by any suitable connections. In the form shown, a heavy spring 6 extends through a transverse hole in the upper die carrier or frame, its ends 7 projecting beyond the die frame and resting upon the side members of the machine frame, as shown in Fig. 3. One or both of these members may be provided with an adjusting device 8, actuated by the external handle 9, for adjusting the horizontal level of the spring ends. The upper die is moved downwardly against the spring pressure by a pair of cams 10, 10, mounted on transverse shafts 11, which are provided with a suitable gearing 12, intermeshing with a driving pinion 13, on the main driving shaft 14. These shafts are thus revolved in opposite directions, and during their revolution, the cams bear on coacting cam faces of the die carrier and force the die downwardly in parallel lines at a portion of each revolution. The die carrier is provided with end guides 15, which guide it in its vertical movement and prevent side movement. To roll the axles over the lower die, we may provide any suitable means, shown in this case as a pair of sprocket chains 16, whose path of travel is between the die surfaces at the sides of the die. These chains move over end sprocket wheels 17, and the shaft 18 of one sprocket wheel is provided with a ratchet wheel 19, which is engaged by a ratchet pawl 20 on a loose lever arm 21, having a link connection 22 with a crank or eccentric on one of the cam shafts. An intermittent movement is thus given to the sprocket chains, and between these sprocket chains extend cross spindles 23. These cross spindles may be spaced at any desirable distances apart and travel between the dies, being smaller in diameter, however, than the axle blank, so that no forging pressure is brought upon the spindles. The axles are dropped between the chains on an extension of the lower die blade and are carried along by the spindles in the intermittent movement of the chains.

The dies shown in Figs. 4 and 5 are provided with suitable recesses or projections of the form shown, whereby the axle blank is gradually tapered toward its central portion, and the wheel seats are gradually formed as the axle blanks move from one end of the dies to the other end. This forging is formed by the reciprocation of the upper die imparting a series of forging pressure strokes as the blank rolls between the dies. Each portion of the blank is thus forged until it gradually assumes the axle shape. The lengths of the dies will, of course, depend upon the number of blows desired or necessary to complete the axle before it reaches the outlet end. The axle blank or cylindrical billet will be elongated during this forging and the distance between the chains is sufficient to allow for this endwise elongation during the forging.

In Fig. 6, we show a form of the dies where the parts most exposed to wear are formed of insert plates 24, which may be renewed when worn.

In Fig. 8, we show another form of connection for actuating the upper die, wherein the pins 25 are provided with toggle links 26, extending upwardly and downwardly and engaging bearings in the machine frame and the upper die carrier, respectively. These pins are simultaneously moved toward and from each other by eccentric bars 27, connected to eccentrics on a central shaft 28. This gives a toggle link movement to the upper die, the greatest pressure being imparted at the end of the down stroke.

The advantages of our invention result from the rapid and cheap forging of the axles effected by the use of our improved apparatus. Hand skill is eliminated, the axles are accurately shaped and the piping heretofore incident to the use of dies, one of which travels over the other, is done away with.

The power for reciprocating the upper die may be applied in many different ways and the lifting movement may be mechanical. The feed of the bars or blanks along the lower die may also be carried out in other ways and many other variations may be made without departing from our invention.

We claim:

1. In apparatus for forging, the combination with top and bottom dies having forming faces of similar and lengthwise changing contour, and means for reciprocating one of said dies toward and away from the opposite die, of means extending between and across the width of said die faces and arranged to contact with and simultaneously move a plurality of blanks being forged from end to end of said forging dies, and mechanism for actuating said blank moving means.

2. In apparatus for forging, the combination of top and bottom dies having forming faces of similar and lengthwise changing contour and means for reciprocating at least one of said dies toward and away from the opposite die, with a series of spindles extending between and across the width of said die faces and contacting with the blanks being forged to move blanks between the die faces from end to end of the forging dies, sprocket chains to which the ends of said spindles are secured and means for actuating the sprocket chains to move the spindles across the forming faces of said dies.

3. In apparatus for forging, the combination of top and bottom dies having forming faces of similar and lengthwise changing contour and means for reciprocating one of said dies toward and away from the opposite die, with a series of spindles extending between and across the width of said die faces and arranged to contact with and move a series of successive blanks being forged from end to end of said dies, sprocket chains to which the ends of said spindles are secured and means connected to the die operating mechanism arranged to actuate the sprocket chains and move blanks in engagement with the spindles across the length of said forging dies in timed relation to the reciprocating movements of the forging dies.

In testimony whereof, we have hereunto set our hands.

GEO. G. THORP.
EDWIN E. SLICK.

Witnesses as to George G. Thorp:
WM. T. DEAN,
E. L. MOE.

Witnesses as to Edwin E. Slick:
H. M. CORWIN,
R. D. LITTLE.